April 30, 1940.  L. J. A. CADET  2,198,759

FLUID METERING DEVICE

Filed May 4, 1937

L. J. A. Cadet,
Inventor

By Glascock Downing & Seebold
Attys.

Patented Apr. 30, 1940

2,198,759

UNITED STATES PATENT OFFICE 2,198,759

FLUID METERING DEVICE

Louis Jules Adrien Cadet, Le Vesinet, France, assignor to Société Anonyme dite: Société d'Etude de Distributeurs Automatiques S. E. D. A., Paris, Seine, France Application May 4, 1937, Serial No. 140,736
In France May 6, 1936

1 Claim. (Cl. 73—247)

The invention has for its object to provide improvements in liquid measuring devices of the so-called "continuous meter" type, that is to say, meters which allow of a continuous output of liquid that is measured at every instant.

Said devices comprise a number of cylinders in which pistons are adapted to move responsive to the pressure of the liquid to be measured, said pistons being adapted to drive a shaft, the rotation of which thus depends on the quantity of liquid flowing through the device. By counting the number of revolutions and fractions of a revolution performed by said shaft, it is therefore possible to measure the quantity of liquid delivered.

One object of the invention is to provide a device of this type in which the distribution to the various cylinders is effected in a simple and efficient manner.

Another object of the invention is to provide such a device in which the distributing member is rendered efficiently liquid-tight without, however, introducing detrimental friction.

A further object of the invention is to obtain this result even if the driving pressure of the liquid passing through the measuring device varies within wide limits.

A still further object of the invention is to provide a liquid measuring device which affords accurate readings even for widely different driving pressures.

Hereinafter, an embodiment of a measuring device according to the invention is described by way of example. Reference is had to the accompanying diagrammatical drawing in which.

Figures 1, 2, 3:
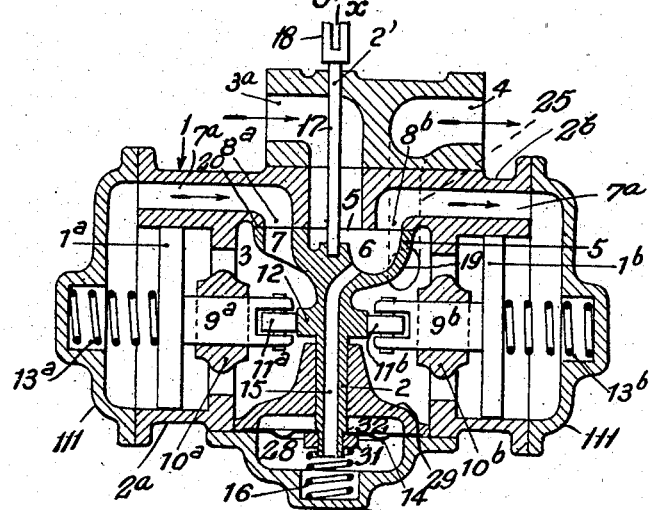
Fig. 1 is a vertical section of the fluid metering device.
Fig. 2 is a horizontal section thereof.
Fig. 3 is a plan view of the distributor removed.

The device comprises a block 1 in which are bored a number of radial cylinders, four in the example illustrated, designated respectively by $2^a$, $2^b$, $2^c$, $2^d$. Said cylinders are evenly and symmetrically arranged about an axis X—X and open at their ends facing the axis X—X, into a central chamber 3 from which they are separated by perforated partitions $4^a$, $4^b$, $4^c$, $4^d$. The central chamber 3 is furthermore limited by a bearing surface 5 into which open, through orifices $8^a$, $8^b$, $8^c$, $8^d$, conduits $7^a$ which are bored in the block 1, the opposite ends of the conduits communicating with the outer ends of the cylinders. Heads 111 fit over the cylinders and at the same time over the conduits $7^a$ at their outer ends.

In each of the cylinders is mounted a piston $1^a$—$1^d$ carried by a rod $9^a$—$9^d$ which is guided in its movement by bosses $10^a$ to $10^d$ provided on the partitions $4^a$—$4^d$. The piston rods $9^a$—$9^d$ terminate at the inner ends in forks in which are mounted ball bearing rollers $11^a$—$11^d$. On their outer faces, the pistons $1^a$—$1^d$ are subjected to the action of springs $13^a$—$13^d$ respectively, which bear on the other hand on the caps 111.

Along the axis X—X of the device, is arranged a central shaft 2 which carries fast thereon a cam-disc 12 adapted to co-operate with the ball bearing rollers $11^a$—$11^d$. On the shaft 2 is fixed an extension rod 17, the end 18 of which is situated outside the device and serves to actuate a revolution counter, not shown.

On the upper end of the central shaft 2 is fixed a distributor 19 having a face 20 which is turned towards and is in contact with the bearing surface 5. On the distributor 19 is provided an inlet port 6 permanently communicating with a liquid inlet conduit $3^a$. A second port 7 is provided in the distributor 19 and permanently communicates with the central chamber 3 from which leads an outlet conduit 25 connected to the delivery conduit 4. The ports 6 and 7 furthermore successively communicate, as explained hereinafter, with the orifices $8^a$—$8^d$, by being brought into register therewith.

A channel 15 provided inside the central shaft 2 communicates with the port 6 and the other end of which opens into a lower chamber 28 which is covered by a lower cap 27 fixed on the block 1. Between said cap and the edge of an inverted cup-shaped member 29 is clamped the marginal part of a deformable diaphragm or membrane 14 provided with a central opening through which passes the central shaft 2. Said diaphragm is fixed, on the other hand, at its central portion, on an annulus 31 which loosely receives the end of the central shaft 2. Said shaft, on the other hand, is provided with a shoulder 32, engaged by the diaphragm 14. A spring 16 which bears on the cap 27 constantly urges the annulus 31 in an upward direction and ensures the liquid-tightness of the distributor when same is inoperative.

The device operates as follows:

Responsive to the pressure of the liquid which enters through the inlet conduit $3^a$ and passes through the port 6, the piston or pistons $1^a$—$1^d$ of the cylinder or cylinders $2^a$—$2^d$ which communicate with said port, are set in motion. The motion of said pistons causes the central shaft 2 to be set in rotation by means of the corresponding rollers 11ᵃ—11ᵈ and of the cam 12. The pistons of the cylinders which communicate with the port 7 are pushed back by the co-operation of the cam 12 with their rollers 11ᵃ—11ᵈ which remain constantly pressed against said cam by the action of the corresponding spring 13ᵃ—13ᵈ and the liquid in these last mentioned cylinders is forced back by the pistons and, through the conduits 7ᵃ and the port 7, reaches the central chamber 3 and the delivery conduit 25—4. In the position shown in Fig. 1 the piston 1ᵇ is the driving piston, whereas the piston 1ᵃ forces the liquid towards the delivery conduit 4.

The rotation of the central shaft 2 causes the cylinders 2ᵃ—2ᵈ to be connected successively to the inlet and to the delivery through the distributor 19, so that the operation of the measuring device is continuous. By means of the rod 17, the number of revolutions effected by the central shaft 2 may be ascertained and the quantity of liquid delivered through the apparatus can be thus measured at any instant.

The incoming liquid passing through the port 6 tends to separate the distributor 19 from its bearing surface 5. According to the invention, this action is counteracted by the pressure of the liquid in the chamber 28 communicating with the port 6 through the channel 15, which pressure is exerted on the diaphragm 14. The effective pressure area of the diaphragm is larger than the effective pressure area of the distributor 19. The upward movement of the diaphragm 14 is transmitted to the central shaft 2 by means of the shoulder 32 which forms also a bearing for said shaft. The ratio between said effective pressure areas is so chosen that during operation, the resultant pressure on the central shaft 2 is such that the distributor 19 is pressed against the contact surface 5 in such a manner as to form a liquid tight joint thereon, without, however, producing excessive frictional resistance to the movement of said distributor on its contact surface. This proper degree of pressure is maintained even in the case of a variation of the pressure of the incoming liquid.

I claim:

In a continuous liquid meter of the type having radiating cylinders, pistons in said cylinders, a chamber disposed between said cylinders and receiving the outflowing liquid, said chamber having a ported bearing surface communicating with the cylinders and the meter inlet, a rotary distributor in said chamber engaging said surface and subjected to the pressure of the inflowing liquid which tends to separate the distributor from the bearing surface, a shaft on which the distributor is mounted and rotated by said pistons, a diaphragm having an effective pressure surface larger than that of the rotary distributor, a connection between said diaphragm and said shaft whereby said shaft may rotate with relation to said diaphragm, and means to subject said surface of said diaphragm to the pressure of the inflowing liquid but in a direction to seat the rotary distributor on said bearing surface.

LOUIS JULES ADRIEN CADET.